(12) United States Patent
Hellsten et al.

(10) Patent No.: US 7,646,335 B2
(45) Date of Patent: Jan. 12, 2010

(54) STEPPED FREQUENCY RADAR DEVICE

(75) Inventors: Hans Hellsten, Linköping (SE); Nils Dagås, Mölndal (SE); Torbjörn Elfström, Fjärå (SE)

(73) Assignee: Saab AB, Linkoping (SE)

( * ) Notice: Subject to any disclaimer, the term of this patent is extended or adjusted under 35 U.S.C. 154(b) by 89 days.

(21) Appl. No.: 11/921,291

(22) PCT Filed: May 31, 2005

(86) PCT No.: PCT/SE2005/000811

§ 371 (c)(1),
(2), (4) Date: Nov. 29, 2007

(87) PCT Pub. No.: WO2006/130051

PCT Pub. Date: Dec. 7, 2006

(65) Prior Publication Data

US 2009/0128400 A1   May 21, 2009

(51) Int. Cl.
*G01S 13/00* (2006.01)
*G01S 13/90* (2006.01)
*G01S 7/40* (2006.01)

(52) U.S. Cl. .............. 342/196; 342/189; 342/25 F; 342/174

(58) Field of Classification Search .......... 342/25 R, 342/25 A–25 F, 173, 174, 189, 192, 196
See application file for complete search history.

(56) References Cited

U.S. PATENT DOCUMENTS 4,028,700 A * 6/1977 Carey et al. .......... 342/194
4,450,444 A 5/1984 Wehner et al.
4,620,192 A * 10/1986 Collins .......... 342/128

(Continued)

FOREIGN PATENT DOCUMENTS

EP   449303 A2 * 10/1991

(Continued)

OTHER PUBLICATIONS

"European Application Serial No. 05748755.5, Communication mailed Mar. 25, 2009", 9 pgs.

(Continued)

*Primary Examiner*—John B Sotomayor
(74) *Attorney, Agent, or Firm*—Schwegman, Lundberg & Woessner, P.A.

(57) ABSTRACT

A radar device (100) comprising transmit and receive parts, and a control unit (CU). The transmit part includes means (WG) for generating a signal within a certain band, and the receive part comprises a filter (AAF), an AD-converter (ADC) and a Fourier transform unit ($FFT_1$). The transmit part generates a group of signals, each having a first bandwidth between a first and a second frequency, in such a way that a larger bandwidth ($B_1$-$B_4$) is covered by the group. The receive part is open over said larger bandwidth ($B_1$-$B_4$) during reception of each signal in said group, and the transmit part comprises means (PAD, $FFT_2$) for creating FFT-copies of the received signals and means (CONJ) for creating conjugates of said copies. The receive and transmit parts comprise means (EXTR) for extracting data from the FFT from the first bandwidth covered by a received signal, and the radar device comprises means (DIFF) for correlating said extracted FFT-data.

9 Claims, 3 Drawing Sheets

U.S. PATENT DOCUMENTS

| | | |
|---|---|---|
| 4,851,848 A | 7/1989 | Wehner |
| 5,229,775 A * | 7/1993 | Sakamoto et al. ............ 342/160 |
| 6,028,549 A * | 2/2000 | Buckreuss et al. ........... 342/159 |
| 6,664,914 B2 | 12/2003 | Longstaff et al. |
| 2009/0128400 A1 * | 5/2009 | Hellsten et al. ............. 342/189 |

FOREIGN PATENT DOCUMENTS

| | | | |
|---|---|---|---|
| GB | 2290188 A | * | 12/1995 |
| WO | WO 97/45752 A1 | | 12/1997 |
| WO | WO-2004/097451 A1 | | 11/2004 |

OTHER PUBLICATIONS

"International Application Serial No. PCT/SE2005/000811, Written Opinion mailed Jan. 3, 2006", 4 pgs.

"PCT Application No. PCT/SE2005/000811, International Search Report mailed Jan. 3, 2006", 3 pgs.

* cited by examiner

STEPPED FREQUENCY RADAR DEVICE

RELATED APPLICATIONS

This application is a nationalization under 35 U.S.C. 371 of PCT/SE2005/000811, filed May 31, 2005 and published as WO 2006/130051 A1 on Dec. 7, 2006; which application and publication are incorporated herein by reference and made a part hereof.

TECHNICAL FIELD

The present invention discloses a radar device which comprises a transmit part, a receive part and a control unit for control of at least one of the transmit and receive parts. The transmit part includes means for generating a transmit signal within a certain band and with a certain duration, and the receive part comprises a first filter, an analogue-to-digital converter and a Fourier transform unit.

BACKGROUND ART

Contemporary radar systems are usually equipped with receivers which are mostly of the heterodyne type with digital signal conversion. A very high degree of receiver linearity is often required, for example, for VHF SAR, (Synthetic Aperture Radar) which is a suitable application of the present invention.

In heterodyne receiver such as those often used in contemporary radar systems, linearity is traded for complex filter or transfer characteristics, implying a complex side lobe pattern if data is windowed by a duty cycle or spectrally for stepped frequency modes. Typically, the side lobes cannot be predicted, and will even vary from one receiver individual to another. The side lobes will also change with temperature or component aging, and will thus require constant calibration efforts.

DISCLOSURE OF THE INVENTION

A radar device, which, among other advantages, overcomes the drawbacks outlined above is offered by the invention in that it discloses a radar device with a transmit part, a receive part, and a control unit for control of at least one of the transmit and receive parts. The transmit part includes means for generating a transmit signal within a certain band and with a certain duration, and the receive part comprises a first filter, an analogue-to-digital converter and a Fourier transform unit.

The control unit is arranged to let the transmit part generate a group of transmit signals, each signal in the group having a first bandwidth between a first and a second frequency and having a certain signal duration, the first and second frequencies of at least one signal in the group being different from those of another transmitted signal in the group. Thus, a second larger bandwidth is covered by the group as a whole than by an individual signal in the group.

The receive part is open for reception over said second larger bandwidth of the group during reception of each signal in said group, and the transmit part also comprises means for creating Fourier Transform copies of the transmitted signals, and means for creating conjugates of said copies.

The receive and transmit parts additionally comprise means for extracting data from the Fourier Transform for the first bandwidth covered by a received signal, and the radar device additionally comprises means for correlating said extracted Fourier Transform data.

Preferably, the signals transmitted in a group consecutively cover said second larger bandwidth, in other words the signals in a group are consecutively "stepped" with respect to their start and stop frequency within the total bandwidth which it is desired to cover. The "stepping" can be either upwards or downwards, i.e. the start frequency of each signal but the first is higher than the start frequency of the previous signal, or the start frequency of each but the first is lower than the start frequency of the previous signal. In addition, it is also possible, if so desired, to intersperse the signals within a group in a more or less arbitrary fashion, since the second larger bandwidth will be covered by the group as a whole.

BRIEF DESCRIPTION OF THE DRAWINGS

The invention will be described in more detail in the following, with the aid of the appended drawings, in which.

EMBODIMENTS

Figure 1:
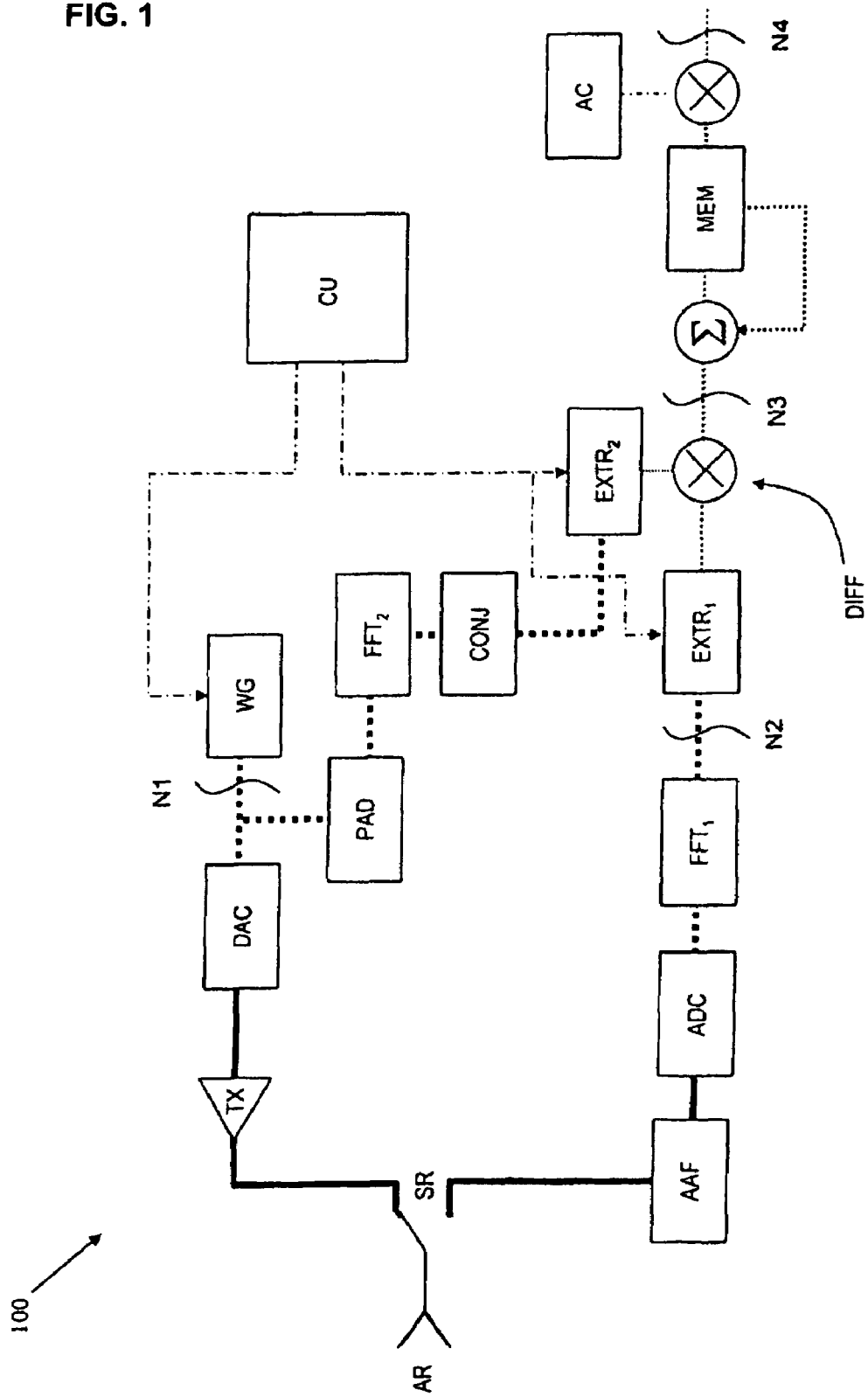
FIG. 1 shows a schematic block diagram of a radar device according to the invention.

FIG. 1 shows a schematic block diagram of an embodiment 100 of a radar device according to the invention. The device comprises a control unit, CU, a transmit part and a receive part. One of the functions of the control unit is to toggle or alternate a transmit/receive switch SR which is shared by the receive and transmit parts, so that the device 100 alternates between a transmission mode and a "listening" mode, i.e. a receiving mode.

During the transmit mode, the control unit activates a Waveform Generator, (WG), which in turn generates an FM-signal for transmission. Suitably, the FM-signal is a linear FM-signal, although other forms of frequency modulation (FM) are possible. The transmit signal generated by the WG is passed through a Digital to Analogue Converter, DAC Following the DAC, the signal can, if so desired, which is generally the case, be amplified by a transmit power amplifier, TX, before transmission from an antenna, AR, of the device.

According to the invention, the WG generates a group of FM transmit signals, suitably linear FM-signals. Each of the linear transmit signals which is generated by the WG covers a predetermined first bandwidth $B_1$ between a first ($f_1$) and a second ($f_2$) frequency and has a signal duration ($t_s$). The transmit signals within the group together cover a second bandwidth $B_2$ which is greater than $B_1$.

In a preferred embodiment of the invention, the transmit signals cover the desired bandwidth in a rising "step by step" fashion, i.e. each signal in the group but the first has a start and a stop frequency which is higher than the start and stop frequency respectively of the signal immediately preceding it. However, variations of this are possible, for example a "descending step by step fashion", i.e. each signal in the group but the first has start and a stop frequencies which are higher than the start and stop frequency respectively of the signal immediately preceding it.

Variations of the ascending or descending "step by step" method are also possible, i.e. so long as the signals in the group together cover the desired bandwidth, a first signal which has start and stop frequencies which are immediately higher or lower than a second signal (compared to the rest of the signals) need not follow immediately after the second signal, the signals can be interspersed in the group.

The receive part of the device according to the invention comprises an Anti Aliasing Filter, AAF, as well as an Analogue to Digital Converter, ADC. More precise details of the design of the AAF and the ADC will be given later in this text, particularly in connection with the description of FIG. 2.

The receive part of the device of the invention is open for reception over the entire second bandwidth $B_2$ of a group when receiving a signal within the group. The received data is passed through an analogue to digital converter (ADC), and for each received signal in a group, an N-point FFT is performed in an FFT unit $FFT_1$.

An extraction unit, EXTR, in the receive part, controlled by the Control Unit, CU, extracts the information contained in the output data from $FFT_1$ between the start and stop frequencies of the signal.

Figure 2:
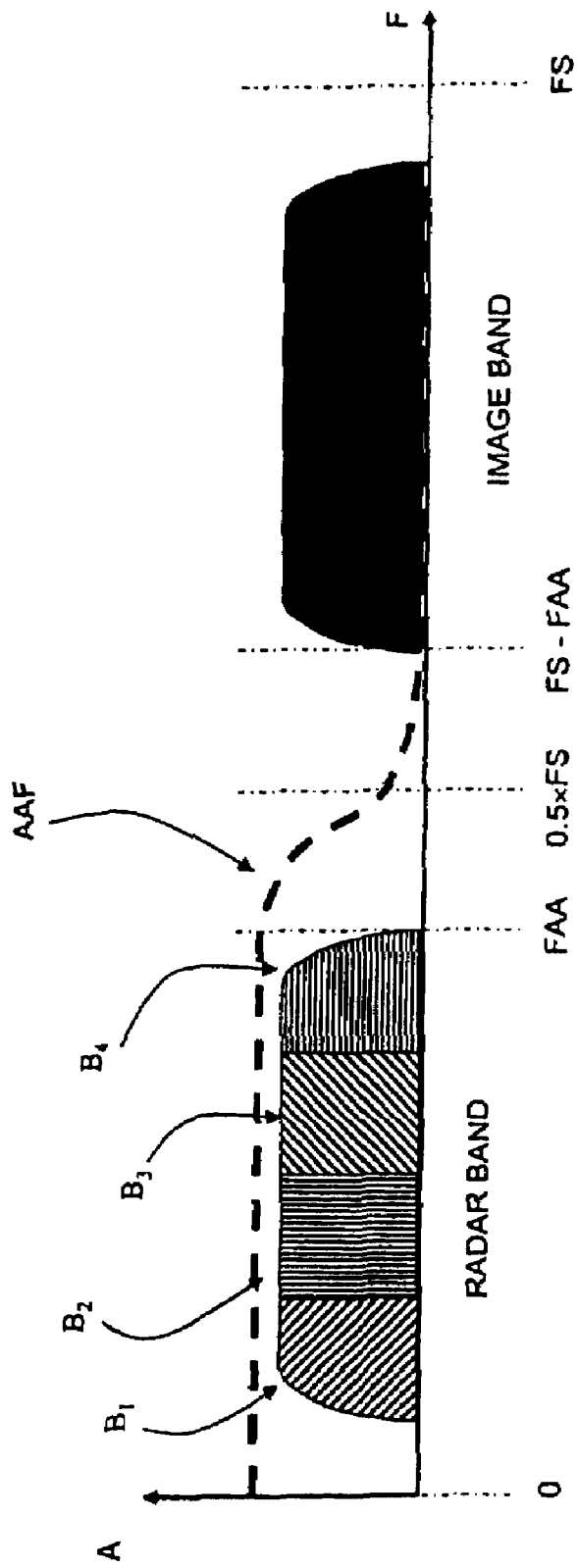
FIG. 2 shows sampling frequency and the composite signal in the device of FIG. 1.

Returning now to the Anti Aliasing Filter, AAF, and the Analogue to Digital Converter, ADC, FIG. 2 illustrates in more detail how these should be designed. The group of signals which is used as an example in FIG. 2 is comprised of four signals covering one sub-bandwidth, $B_1$-$B_4$, each.

The ADC samples incoming signals with a certain sampling frequency, FS. The highest frequency within the sub-bands $B_1$-$B_4$, denoted as FAA in FIG. 2, should be chosen as FAA<FS/2 in order for the AAF and the ADC to function satisfactorily. An "image band" which it is the function of the AAF to stop is shown in FIG. 2, as well as the characteristics of the AAF, which is shown with a dotted line which surrounds the radar band $B_1$-$B_4$. As shown in FIG. 2, at the frequency given by FS-FAA, the filter should preferably offer a complete "cut-off" of signals.

Figure 3:
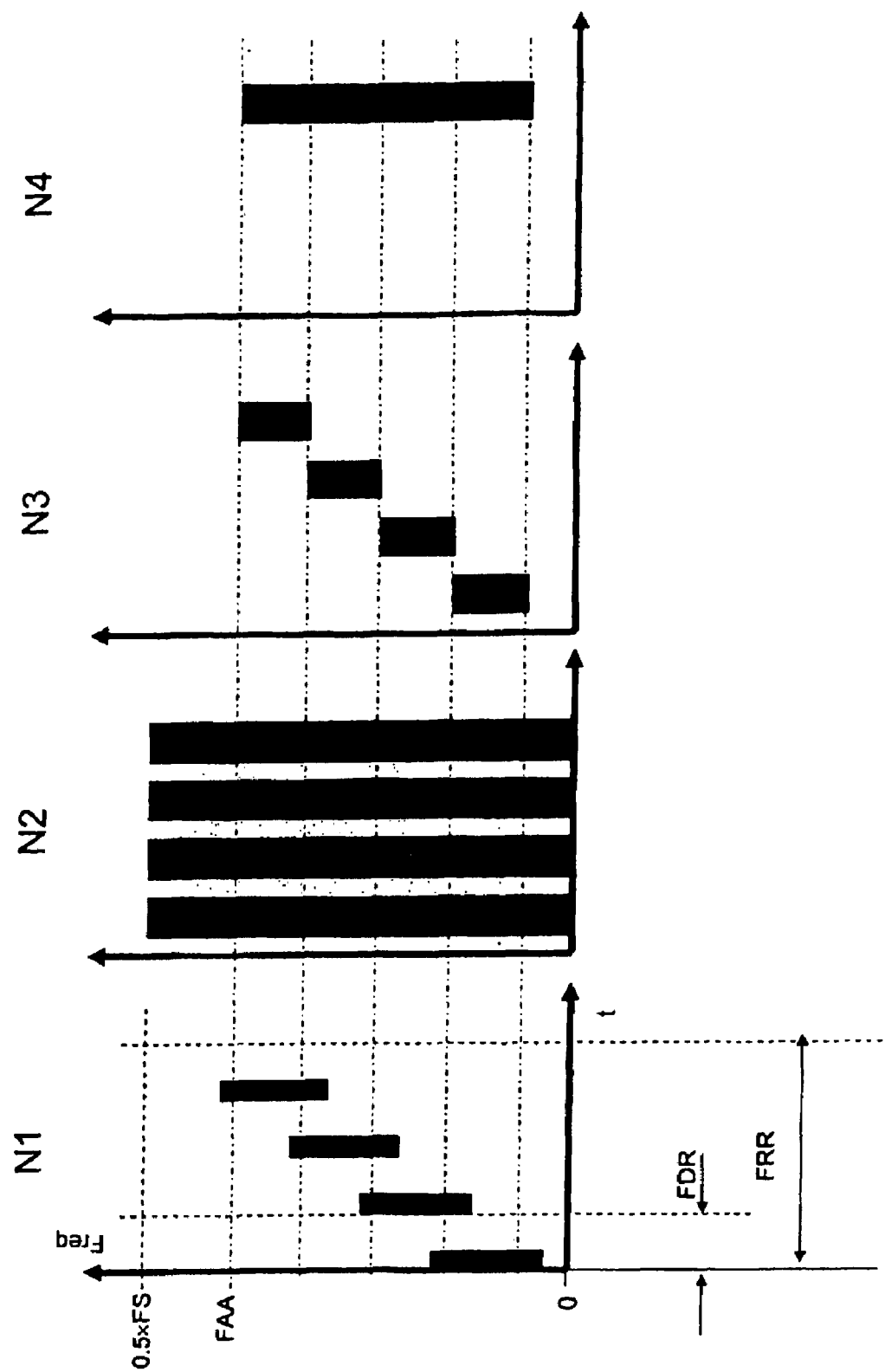
FIG. 3 shows the signal in various nodes in FIG. 1.

FIG. 3 shows the frequency coverage of the signal in four different "nodes" $N_1$-$N_4$ in the device of FIG. 1. In each node, the total area of the columns shown corresponds to the amount of data which streams through the node within an FRR (Frequency Recurrence Rate) period, a concept which will be explained later in this text.

As is also indicated in FIG. 1, the four nodes $N_1$-$N_4$ are as follows:

$N_1$ is a node between WG and DAG in the transmit part of the device, $N_2$ is a node between $FFT_1$ and the EXTR on the receive side of the device, $N_3$ is a node before the memory bank on the receive side of the device, $N_4$ is a node after the memory bank on the receive side of the device.

As can be seen in FIG. 3, the signal processing progresses as follows: In $N_1$, which is before the signals in a group are transmitted, the signals and their "step by step" pattern can be clearly discerned. The four signals in the group shown in FIG. 3 are the same as those in FIG. 2, i.e. each signal covers a sub-band $f_1$-$f_4$ within the total desired bandwidth. Each signal but the first overlaps the signal immediately preceding it, which is not absolutely necessary. The overlap is intended to compensate for some "windowing" effects and side lobe effects.

As can also be seen, the highest frequency in the group, FAA, is below FS/2, FS being the sampling frequency of the ADC.

As can be seen in FIG. 3, with reference to Node 1 in that fig, the signals in the group are separated by a time interval which will be referred to as Frequency Dwell Rate, FDR. Each individual signal in the group has a specific duration, which in FIG. 3 is shown as being equal for all signals. This need not, however, be so, each signal within a group can be of an individual duration.

As a brief comment on the N-point FFT which is carried out in the device of the invention, the number N is an integer which is suitably determined by the FDR, the Frequency Dwell rate and the sampling rate of the ADC, so that N can be chosen as a number which can be expressed as $2^x$.

As is also shown in FIG. 3, there is also a certain rate with which the group pattern is repeated, i.e. a rate with which the transmissions return to the same transmission frequency. This rate will be referred to as Frequency Recurrence Rate, FRR.

In node $N_2$, all of the signals comprised in a group have been received and processed by $FFT_1$, resulting in one "data" column for each of the four transmitted signals. However, only the data for the sub-band which is covered by each signal is of interest, the remainder of each column can be discarded, which is the function of the EXTR-unit. In a manner which will be described in more detail later in this text, only the relevant data is extracted by EXTR, resulting in the data columns shown in FIG. 3 with reference to Node 3. As can be seen, in Node 3, only data from the respective sub-band corresponding to each column is extracted from the individual columns of Node 2.

Following the extraction of relevant data from each of the individual data columns, the extracted data is then used as input to a memory bank MEM, in which incoming data is added iteratively, so that the extracted data is used to form one continuous stream of data, as shown with one continuous column in FIG. 3 with reference to Node 4. Data can then be retrieved from the memory bank MEM at a rate which is decided by the "usee", usually a Data Processing Unit or Signals Processing Unit, neither of which are shown in the block diagram of FIG. 1.

With renewed reference to FIG. 1, the mechanism by which data is extracted by means of the EXTR units in the receive and transmit parts of the device will now be described: A received signal will be a summation of delayed and attenuated copies of the transmitted signal which have been reflected from a target such as, for example, the ground. Thus, the ground scattering process can be assumed to be time invariant, and will only transform the transmitted signal Fourier amplitudes by multiplying each of them with complex numbers.

Accordingly, dividing the Fourier Transform (in this case, an FFT) of the received signals by that of the transmitted signals will determine the ground transfer function, the GTF. In practice, the division can also be substituted with multiplication of the phase conjugate of the signal. This is carried out in the following manner: on the transmit side of the device, the signal which is generated by the WG unit and which is to be transmitted is also, prior to being input to the DAC, used as input to a "padding unit" PAD, where the signal is "zero padded" to reach the same digital length as the receive signal.

The zero padded signal copy is then used as input to an FFT unit $FFT_2$, where an N-point (N being the same integer for the signal copy and the receive signals) FFT is performed on it. The Fourier transformed signals from $FFT_2$ are then phase conjugated in a unit for this, CONJ, and used as input to a second extraction unit $EXTR_2$.

Thus, there will be two signals, a receive signal being output from $EXTR_1$ and a transmit signal which is output from the $EXTR_2$. These two signals are then used as input to a phase difference detector, DIFF, which correlates said FFT-data. One suitable example of such a difference detector or correlator is a multiplier, as indicated in FIG. 1.

The output from DIFF will, as explained previously, with a possible amplitude correction, be the Ground Transfer Function, the GTF, which it is desired to obtain in a radar which is used for detection of objects on the ground. As also explained previously, the output from DIFF is used as input to a memory bank, MEM, in which incoming data is added iteratively.

As indicated in FIG. 2, a certain tapering of the outermost sub-bands $B_1$ and $B_4$ might be desired. In such a case, the device of the invention can, for example, be equipped with an Amplitude Control unit, AC, which applies its transfer function to the output of the memory bank MEM. The AC unit shown in FIG. 1 contains stored amplitude correction factors by which the output of the MEM is multiplied.

The AC can also be used for other reasons, for example to compensate for variations in other components in the device.

The invention claimed is:

1. A radar device, comprising:
 a transmit part,
 a receive part,
 a control unit for control of at least one of the transmit and receive parts,
 the transmit part including means for generating a transmit signal within a certain band and with a certain duration, and
 the receive part comprising a first filter, an analogue-to-digital converter, and a Fourier transform unit,
 wherein the control unit is arranged to let the transmit part generate a group of transmit signals, each signal in the group having a first bandwidth between a first and a second frequency and a certain signal duration, with the first and second frequencies of at least one signal in the group being different from those of another transmitted signal in the group, so that a second larger bandwidth is covered by the group than by an individual signal in the group, the receive part being open for reception over said second bandwidth of the group during reception of each signal in said group,
 wherein the transmit part comprises means for creating Fourier Transform copies of the transmitted signals, and means for creating conjugates of said copies,
 wherein the receive and transmit parts comprise means for extracting data from the Fourier transform unit for the first bandwidth covered by a received signal, and
 means for correlating said extracted fast Fourier transform data.

2. The radar device of claim 1, additionally comprising means for storing the extracted correlated data.

3. The radar device of claim 2, in which the transmitted signals in a group consecutively cover said second larger bandwidth.

4. The radar device of claim 2, in which the first frequency of each signal but the first is higher than the start frequency of the previous signal.

5. The radar device of claim 2, in which the start frequency of each signal but the first is lower than the start frequency of the previous signal.

6. The radar device of claim 1, wherein the transmitted signals in a group consecutively cover said second larger bandwidth.

7. The radar device of claim 1, wherein the first frequency of each signal is higher than the start frequency of the previous signal.

8. The radar device of claim 1, wherein the start frequency of each signal lower than the start frequency of the previous signal.

9. The radar device of claim 8, further comprising a memory to store the extracted correlated data.

* * * * *